United States Patent [19]

Yasui et al.

[11] Patent Number: 4,792,490

[45] Date of Patent: * Dec. 20, 1988

[54] COMPACTED AGGLOMERATES OF POLYMER LATEX PARTICLES

[75] Inventors: Hideo Yasui, Kobe; Yasuhiro Miki, Himeji; Wataru Okada, Kobe, all of Japan

[73] Assignee: Kanegafuchi Kagaku Kogyo Kabushiki Kaisha, Osaka, Japan

[ * ] Notice: The portion of the term of this patent subsequent to Aug. 30, 2005 has been disclaimed.

[21] Appl. No.: 35,795

[22] Filed: Apr. 8, 1987

[30] Foreign Application Priority Data

Apr. 8, 1986 [JP]  Japan .................................. 61-80338

[51] Int. Cl.$^4$ ........................ B32B 27/06; C08F 6/22
[52] U.S. Cl. ................... 428/407; 428/402; 523/352; 528/488; 528/490; 528/499; 528/502
[58] Field of Search ............... 528/499, 488, 490, 502; 523/352; 428/402, 407

[56] References Cited

U.S. PATENT DOCUMENTS

| | | | |
|---|---|---|---|
| 2,408,128 | 9/1946 | Squires, Jr. et al. | 528/502 X |
| 2,556,260 | 6/1951 | Downing | 528/502 X |
| 2,558,948 | 3/1952 | Westfahl | 528/936 X |
| 4,213,888 | 7/1980 | Karg et al. | 528/483 X |
| 4,446,309 | 5/1984 | Jiroumaru et al. | 523/352 X |
| 4,491,658 | 1/1985 | Sugimori et al. | 528/486 |

*Primary Examiner*—Joseph L. Schofer
*Assistant Examiner*—F. M. Teskin
*Attorney, Agent, or Firm*—Armstrong, Nikaido, Marmelstein & Kubovcik

[57] ABSTRACT

The present invention provides polymer latex grains having latex particles which compose each coagulated grain compacted therein in the state of not being mutually fused; said grains are obtained by the following steps of (A)–(E):

(A) into a polymer latex manufactured by emulsion polymerization or suspension polymerization, a coagulant is added at a temperature lower than the temperature (softening temperature) at which latex particles are adhered by fusion, to be dispersed and scattered in said polymer latex as minute volumes of said coagulant, before said coagulant has been dissolved and diffused into said polymer latex;

(B) by letting said coagulant dissolve and diffuse into said latex from the scattered minute volumes of said coagulant, the latex particles are coagulated on the outer surfaces of the minute volumes of said coagulant as the centers, to have coagulated grains grow from inside out, thereby forming spherical grains of an arbitrary range of sizes regularly filled with the latex particles;

(C) said coagulated grains are separated from said polymer latex;

(D) then, said coagulated grains are immersed in water in the state of holding their temperature lower than the softening temperature of the latex particles; and (E) they are dried at a temperature lower than the softening temperature of the latex particles.

The polymer latex grains of this invention have small contents of foreign matters and residual monomers and permit their interior to be homogeneously impregnated with liquid substances; the dried grains may be homogeneously and rapidly dispersed or dissolved in liquid; and further, they are excellent in physical properties like shape holding property, bulk sp. gr., etc.

14 Claims, 3 Drawing Sheets

COMPACTED AGGLOMERATES OF POLYMER LATEX PARTICLES

BACKGROUND OF THE INVENTION

1. Field of the Invention

The present invention relates to agglomerates of latex particles formed by turning latex particles into regularly arranged and aggregated compacted grains by availing themselves of their flocculation and coagulation in polymer latex and, then, separating these grains from the polymer latex, after which their interior is further compacted.

2. Description of the Prior Art

Heretofore, as a method of recovering polymer from polymer latex obtained by emulsion or suspension polymerization, because the latex particles being in a dispersed phase very minute bodies, it is a normal practice to apply to process of refinement and drying, after forming aggregates of the latex particles. Generally, an aqueous solution of a coagulant such as inorganic salts, acids, etc., is added to latex or, conversely, latex is brought into aqueous solutio of such a coagulant, thereby to coagulatetthe latex in the liquid phase, and after turning it into a slurry form by such an operation as heat treatment, etc., it is obtained in a powder form through dehydration and drying. According to this method, the grain surface needs to be fused and solidified by way of heating treatment, since the coagulated grains themselves mainly comprise fine grains which are weak. Because the particle surface is fused and solidified, it becomes extremely difficult for foreign matters to move out of the grains, thus yielding high purity powders containin foreign matters. The powder has characteristics such that it has a small bulk density and low fluidity and tends to make dust and form block, and it is composed of grains which are amorphous, of which many are fine grains and which have a wide range of grain size distribution.

When this powder is ueed for the purpose of forming solutions or fine dispersions by redispersing it into solvents, since the latex particles have been fused by heating treatment, etc., they can not be adequately separated into latex particles; as a result, their dissolution is difficult and their perfect dispersion can not be formed; such other problems will arise. Moreover, degradation in quality due to containing of foreign matters is unavoidable. And when injection molding is to be performed, making direct use of this powder, reduction in the rate of injection or in the productivity occurs, or yellowing, silver streaks, flow marks, etc., will be generated, or degradation in physical properties will take place. Actually these problems make direct molding with it impossible.

Various powder manufacturing methods by way of coagulation have been developed with the aim at improvement in such characteristics, but they are intended mainly to solve problems in the processes for manufacturing powders or those involved in handling them, but are incapable of dealing with such themes as manufacturing large grains which adapt to the aforementioned two usage examples or removing of impurities, compacting of intragrain latex particles, etc. On the other hand, methods of drying latex without coagulation it, for example, spray drying or vacuum drying, are available, but all of them embrace problems which basically defy solution such as remaining of all impurities in latex, or in the forming of large grains, intragrain compacting, etc.

SUMMARY OF THE INVENTION

An object of this invention is to provide high purity polymer latex grains with small content of inorganic salts, organic water soluble foreign matters and oil soluble foreign matters, residual monomers, etc.

Another object of this invention is to provide polymer latex grains which permit uniform impregnation of intragrain spaces with water soluble materials, oil soluble materials, liquid materials, etc.

Still another object of this invention is to provide polymer latex grains which give high rates of dispersion and dissolution and which are capable of making fine dispersion of particles as homogeneous latex particles in dispersing or dissolving dried grains into aqueous solutions or organic solvents.

It is another object of this invention oo provide polymer latex grains which have form maintaining capacity and large bulk specific gravities, in spite of the latex grains being not fused to each other, which do not produce fine powder and, accordingly, permit easy transport and handling and which do not involve such problems as blocking, bridging, etc., in storage bins.

It is still another object of this invention to provide polymer latex grains which enable producing homogeneous molds having small numbers of fish eyes and which permit direct injection molding, omitting palletizing process.

Other objects and advantages of this invention will become apparent from the following detailed description:

BRIEF DESCRIPTION OF THE DRAWINGS

PHOTOS 1 through 6 all are microscopic photographs showing the particle structures of the spherical compacted grains of this invention, of which:

PHOTO 1 is a photograph of the dried grains obtained in Example 1;

Figure 1:
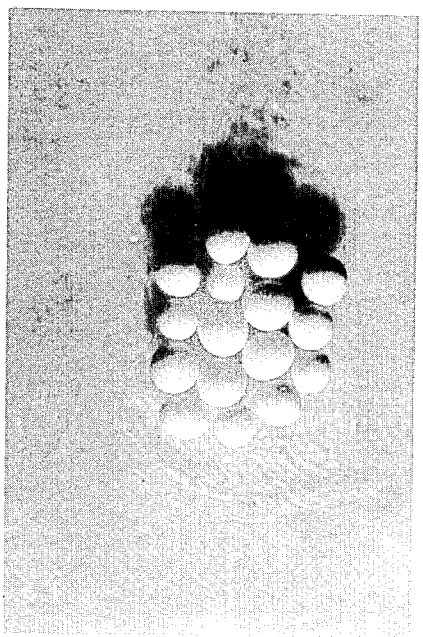
Figure 2:
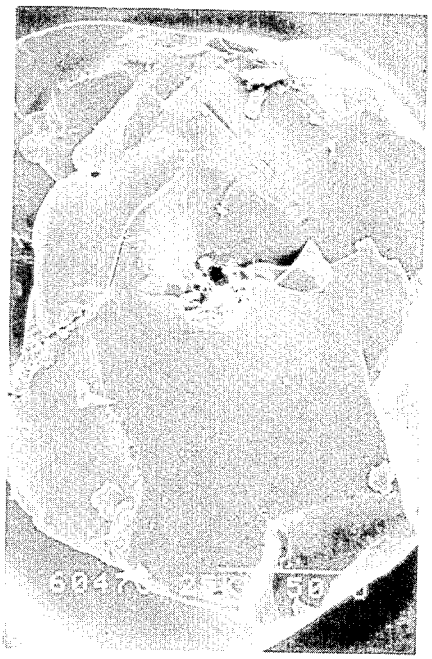
Figure 3:
Figure 4:
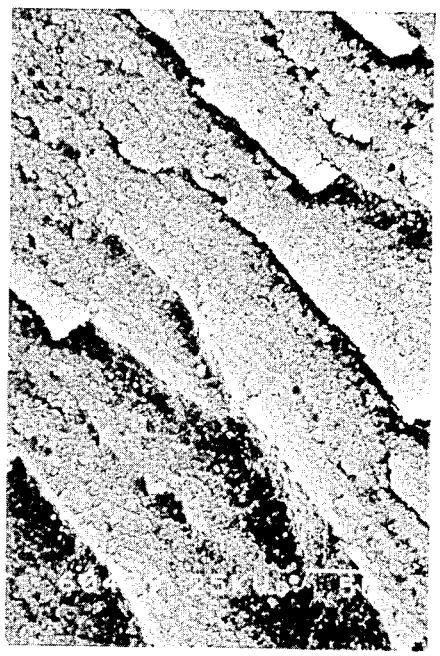
Figure 5:
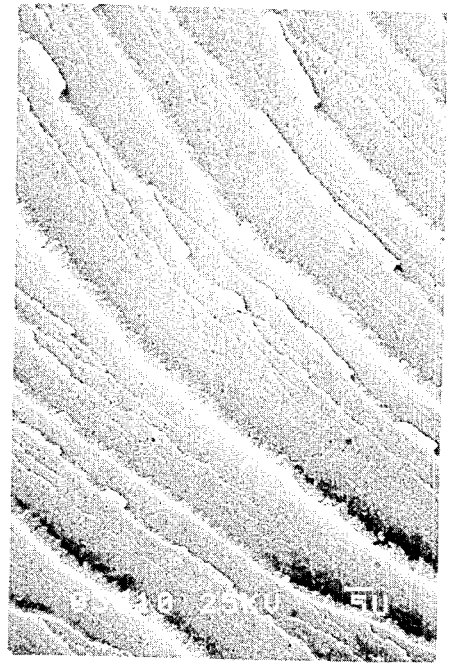
Figure 6:
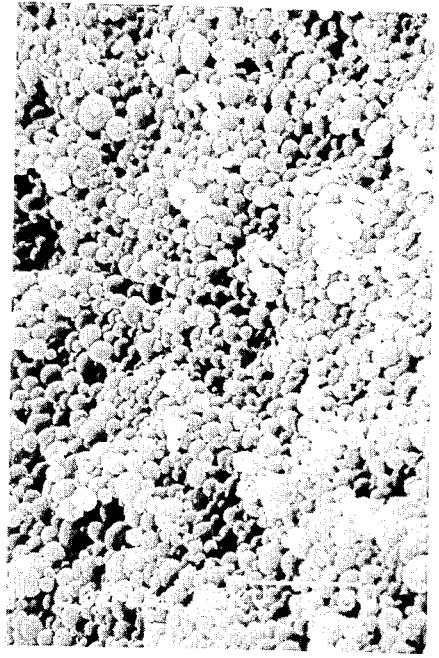

PHOTO 2 is a photograph of the interior of the grain which has been fractured;

PHOTO 3 is a photograph of sintered grains obtained in Example 1;

PHOTO 4 is a photograph of the grain interior of the dried grain obtained in Example 3 which has been fractured;

PHOTO 5 is a photograph of the grain interior of the sintered grain obtained in Example 3; and PHOTO 6 is a photograph of the grain interior of the dried grain obtained in Example 7.

DETAILED DESCRIPTION OF THE INVENTION

The basic processes of the method for acquiring the grains of this invention comprise:
(1) taking the following steps:
  (1-a) forming spherical grains of an arbitrary size in which latex particles are closely packed by way of coagulation performed at a temperature lower than the temperature at which latex particles are adhered by fusion (hereinafter referred to as softening temperature) and, then, taking them out of latex,
  (1-b) immersing the coagulated grains in water and, thereafter, taking them out therefrom; and
  (1-c) drying them into dried grains; and
(2) turning the dried grains into sintered grains, as required, by holding them at a temperature higher than the temperature at which the latex particles fuse together (called sintering treatment).

That is to say, in step (1-a), coagulated grains which are strong enough to withstand handling in manufacture are obtained without conducting heating treatment; in steps (1-b) and (1-c), simultaneously as further closely packing latex particles, water soluble impurities and volatile impurities are respectively removed, taking advantage of the existence of interstices between latex particles; and further, as required, in step (2), fused high density grains of which interior is uniform continuous mass having no cavity are obtained. Further, if need be, it is also possible in steps (1-b) and (1-c), to uniformly impregnate the grains with desired materials by immersing them in desired chemical solutions or to remove oil soluble impurities by extraction.

According to the present invention, a coagulant is added to latex, to be dispersed as minute volumes into said latex, while suppressing its diffusion thereinto, thereby forming scattered seed coagula; thereafter, by getting the coagulant naturally dissolved and diffused into said latex from said scattered seed coagula, said latex is coagulated along with the seed coagula as the centers, thereby causing growth of coagulating particles to be made from inner to outer part, subsequently to be separated as coagulated grains from said latex; then, they are immersed in an aqueous phase, followed by drying, yielding the object grains and, as required, these grains are sintered at a temperature higher than their softening temperature after or simultaneously as the drying.

This invention is based on the processes of obtaining coagulated grains in a state of latex particles being closely packed, but not being fused together (also a state in which they are regularly arranged in a crystal configuration). In forming such coagulated grains, first, the coagulant is scattered in latex in the state of being dispersed as minute volumes but not dissolved therein, as the first step. Since the coagulation reaction rate is generally very high, the coagulation takes place in the process of dispersing and scattering the coagulant as minute volumes in latex, causing coagulated product to form on the outer circumferences of minute volumes of the coagulant, thus coating their surfaces. Or coagulated grains which have undergone partial advancement of coagulation are sometimes broken down and divided and are, then, dispersed and scattered into coagulant seeds. Accordingly, even if the coagulant is liquid or gas, if fact, the scattered coagulant seeds may be believed to form solid grains having coagulants at their centers and coagulated mass around their perimeter.

Then in the second step, the coagulant at the center dissolves and diffuses, to come out from the interior through the peripheral coagulated matter layer, and simultaneously therewith, it comes in contact with latex at the surface, immediately undergoing coagulation; then, the latex particles are laminated on the outer surface, thereby making gradual growth of coagulated grains from the interior.

The point in exercising this invention lies in the first step: Thus in the first step:

(1) If the coagulation rate is low, the coagulation does not take place on the surface, but the coagulant diffuses into the latex phase, causing coagulation there.

(2) And if the coagulated matter layer formed on the outer surface is weak, the coagulated matters are readily dispersed into the latex phase, causing coagulation there.

The aforementioned processes of (1) and (2) both lead to coagulation of the whole of latex, which represents what is done by the conventional coagulation method as it is.

Accordingly, it is the present object to set the conditions for preventing the processes of (1) and (2). Since if the coagulant is in an aqueous solution and its concentration is low, both processes of (1) and (2) tend to occur, the concentration should desirably be high. Besides, if its concentration is low, it is difficult to disperse the coagulant exactly into minute volumes, such devices are necessary as increasing the viscosity by adding thickness or suppressing dissolution and diffusion of coagulant in latex and coagulation by lowering the temperature until the minute volumes of coagulant are scatted. The aforementioned facts suggest that using the coagulant as solid powder is most handy and sure. Especially, when the coagulant is liquid or gas, the higher the coagulation rate, the easier it becomes to achieve stable operation. Generally, acids and salts of higher valent metals which have large coordination numbers lend themselves to this application, but conversely, too high a coagulation rate makes it difficult to scatter coagulant seeds in latex. Accordingly, sometimes it becomes necessary to control the concentration, with water or alcohol in the case or liquid and with air, nitrogen or water soluble carbon dioxide as a diluent in the case of gas. And it is possible to regulate the relationship between the dispersion of coagulant in latex and the reaction rate or diffusion rate through temperature adjustment by cooling the coagulant and through viscosity adjustment by addition of thickener.

Similar thing may be said of the solid concentration of the latex. Thus, as latex is more thinned, the frequency with which the latex particles, being the object of reaction, come to the outer surfaces of the coagulating grains will become low; consequently, the coagulant tends to diffuse out into the lates phase, with the result that the process of (1) takes place; then, naturally, the solid content density of the coagulated layer will diminish, resulting in weakening of the coagulated layer, whereby the process of (2) will be brought about. Accordingly, the higher the latex density, the more sure it will become to form grains.

Preferred embodiments of this invention are detailed hereinder:

(1) When the coagulant is solid:

① Latex is put in a beaker and stirred. A powdery solid coagulant like salts, etc., is put in this beaker and instantaneously strongly stirred so as to disperse it in latex, immediately followed by slow stirring. This state is maintained for 1 min–1 hr; then, the stirring is stopped and coagulated grains are taken out by passing the latex through a sieve. Under weak stirring, the coagulant will settle to the bottom, forming semispherical coagulated grains.

② A powder dispersion of coagulant is formed in an organic solvent being a water soluble organic solvent such as alcohols, ketons, etc., and which is unable to dissolve or hard to dissolve the coagulant and this dispersion is added to the latex.

(2) When the coagulant is liquid:

① The coagulant is dropwise added to the latex.

② The coagulant is added as fine particle drops into the latex by spraying it.

③ When the coagulant is summarily added into the latex, strong stirring is made only when adding the coagulant, whereby the coagulant is dispersed as droplets in latex; thereafter, stirring is made slowly.

For the purpose of keeping the diffusion rate low, it may be desirable to cool the latex and the coagulant beforehand. After its dispersion, cooling is not particularly required. In order to form dispersed droplets, while suppressing diffusion, addition of thickener to coagulant is effective.

(3) When the cagulant is gas:

The coagulant gas and latex are cooled eeforehand, they are added in the neighborhood of the bottom of the stirring vanes. Then by way of strong stirring, the gases are dispersed in the latex.

(4) When the coagulant is in a slurry from or in a state of being absorbed in solid:

Normally the same method as for solid is applicable.

In producing slurry, for example, random flocculates are formed by adding a diluted aqueous solution of coagulant into latex under vigorous stirring, yielding coagulated slurry and in forming impregnated solid, powder particles are immersed in an aqueous solution of coagulant, to get the coagulant permeated into the particles, and thereafter, the aqueous solution of the coagulant left on the particle surface is drained off by filtration; such a solid product may be mentioned as an example.

The stirring at the time of coagulation should be done so slowly that the agglomeration of coagulating particles through mutual collisions may be prevented, after the coagulant seeds have been scattered in the latex. However, if it is too weak, the coagulating particles settle and make contact with each other, thereby to be agglomerated. The coagulating grains, which are always growing, tend to be agglomerated. If it is too strong, besides the agglomeration of the coagulating particles, dissolution and diffusion of coagulant is induced by breakdown of coagulated grains, giving rise to the conventional coagulation, and yielding rrandom agglomerate, which is a wholly coagulated prouuct, etc. Especially, when the latex density is low or when use is made of coagulants having weak coagulating power, caution is necessary. This suggests that the liquid llow at the time of coagulation is desired to be in laminar flow state.

Since the presetting of the operation conditions at the time of making coagulation constitutes a crucial point in embodying this invention, it is necessary to get a preliminary grip by experiments on mutual relations between the dispersing and scattering rates of coagulant, coagulation reaction rate and the diffusion rate of coagulant into latex, even though their absolute values are not obtainable. For this purpose, it is indispensable to know how the behavior of forming coagulated grains and how the phenomenae occuring in latex qualitatively tend to undergo changes under varying operation conditions including temperature, viscosity, stirring velocity, etc.

The grains of this invention need to be separated from the coagulation system in the state of the latex particles, being the basic particles, eeing not mutually adhered by fusion. Accordingly, the temperature of the coagulation system or the whole of the latex tank has to be kept at a low temperature lower than the softening temperttture of the latex particles in performing the coagulation operation. Therefore, with a polymer latex of which the softening temperature is lower than the latex tank temperature, the need for conducting the coagulation operation while the system is being cooled will arise.

In the coagulated grains obtained in this way, a small random coarsely packed part is left at the center of each grain, because the coagulation which occurs immediately after or partly at the same time as the dispersion at scattering of coagulant in latex, being the first step, is very rapid. The size of this random coarsely packed part is larger with coagulants which give higher coagulation rates and when the coagulants are liquid, it tends to be larger with their diminishing concentrations. If the coagulant is solid, a void which corresponds to the trace of such a solid mass is left at the center of each grain. Whatever the case, such a coarsely packed part or such a void at the grain center is quite small, as compared with the whole of each grain, the grain may be regarded as a homogeneously packed matter as a whole.

By getting the coagulated grains separated frmm inside latex, subsequent operations are made practicable, to obtain grains suitable for any purposes. Thus they include high purity grains from which water soluble impurities, oil soluble impurities and volatile impurities are removed, grains which permit easy dispersion into latex particles grains of a fused mass structure having no cavity and grains uniformly containing useful substances. In this way, not only the merits in the manufacturing processes are pursued, but the grains may be adapted to various new uses.

Accordingly to this invention, first, a state is produced in which coagulant particles are scattered in a latex containing a high density of coagulant without being dissolved therein, and then, they are naturally diffused into the latex, so that the coagulation may be governed by the diffusing of the coagulant into the latex. In this way, unit particles seem to become regularly disposed inside the coagulated mass. In addition, when the latex particles make growth as coagulated agglomerates, the latex particles give the behavior of taking the highest compacted arrangement that is on the lowest energy level; as a consequence, the grain density will become larger than the particle density of the latex. The order of density depends on the level of the agglomerating power and the time to spare for rearrangement of unit particles. Thus if the power for agglomeration by fusion is large, when latex particles come in contact with each other by the coagulation, the latex particles can not be densely arranged. This situation will be determined by the balance between the softening temperature of the latex particles and the temperature of the coagulation system. On the other hand, the slower the coagulation reaction rate, and the slower the diffusion rate of the coagulant, the more time to spare for rearranging latex particles is produced, with resultant closer packing degrees. When the latex particles are not quite fused, the interparticular bonding force is the small van der Waarls force only, but as a plurality of these particles combine to each other forming a network, the holding strength of the coagulating particles becomes strong. This is because with increasing number of particles being in contact with each other, thus with rising packing degree in the coagulating grain, regularity in the bonding of latex particles manifests itself and, consequently, the number of particles in proximity to each other augments and, thus the holding power grows stronger. Then the latex is strong enough to bear industrial handling as solid, even though it is not agglomerated by fusion. The strength required is determined according to the operation of handling coagulated grains and this strength depends on the physical properties of the latex particles and the packing degree of latex particles in the coagulated grains. Since the packing rate depends on the latex solid content density, the latex solid content density generally is also required to be higher than 7 vol % and should preferably be higher than 20 vol %, and as for density, the higher the better. Accordingly, if there are any limitations on hardness or strength from the handling standpoint of coagulated mass, making such a device as preliminarily thickening the latex to be coagulated or slowing the coagulation reaction rate or the diffusion rate or the like is necessary. The coagulated grains with increased packing rate give high holding strength, such that deformation or breakdown in such physical operations as their separation from inside the latex and cleaning, etc., may be averted. That the way of packing of the latex particles in the coagulated grain is regular may be ascertained from the fact that the coagulated grain can be assumed to have a crystalline structure, because on its fractured surface, a cleavage with a regularly staired and layered pattern is observed.

The size and grain size distribution of the coagulated grains depend on the sizes of the individual minute volumes of the coagulant dispersed in the latex, their distribution and the coagulation time and their dispersion. Intrinsically, the grains obtained by the method of this invention are grains with homogeneous evened-up grain size range which involve quite no fear of producing fine powders. When it is desired to form fine grains, it is proper to get a coagulant having small coagulating power scattered by dispersion in latex as minute volumes and, then, separate the coagulated grain from the latex in short time. On the other hand, formation of large grains is made by applying opposite conditions. Thus their size may be freely controlled. This method is generally suitable for obtaining grains with diameters of the order from about 200 μm to 1 cm. Where the grain size distribution is concerned, it is easy to obtain homogeneous grains, but in order to achieve further improvement in the homogenuity, it is desirable to even up the size of the minute volumes of the coagulant dispersed in latex and to make the coagulation time uniform; especially, if the operation is run continuously, some device is required to equalize the residing time of the coagulating particles isside the coagulation apparatus.

As for the grain size, agglomeration of coagulating particles should be considered. The coagulated grains of this invention have latex particles regularly arranged, thereby forming firm units; accordingly, they do not make further agglomeration, even if they came in contact with each other in latex in the state of ceased coagulation growth. So long as the temperature is held below the softening temperature of latex particles, there is no possibility of their making agglomeration. Under the state of coagulating particles growing by coagulating surrounding latex, however, they tend to agglomerate; this tendency is particularly notable in the initial period of coagulation. For prevention of development of agglomerated grains, such devices as dmminishing the density of particles in latex which are making coagulation growth or giving the coagulating particles kinetic energy by way of stirring, etc., are required. However, extremely vigorous stirring should be carefully avoided, for it would cause breakdown of coagulated grains or impair the stability of the latex-coagulant system, leading to coagulation and solidification of the whole of latex. For the growth of particles, gradual flow in the laminar state is desirable.

The gradual flow mentioned here implies a stirring state such that the solid particles do not settle at the bottom of the stirring tank. Actually, stirring should preferably be done at higher than the critical agitator speed for fluidization of solid particles which is determined by the following formula, but at as low an rpm of stirring as possible:

$$nf = KD^{-2/3} \cdot dp^{1/3} \cdot \left(\frac{\Delta\rho}{\rho c}\right)^{2/3} \cdot \left(\frac{\mu}{\rho c}\right)^{-1/9} \cdot \left(\frac{V_p'}{V_p}\right)^{-0.7}$$

where,
nf: Critical agitator speed for fluidization of solid particles (rpm),
K: Coefficient 200–250,
D: Tank diameter (m),
dp: Solid grain diameter (mm),
$\rho c$: Liquid phase density (g/cm$^3$),
$\Delta\rho$: Grain density difference (g/cm$^3$),
$\mu$: Viscosity (cp)
$V_p'$, $V_p$: Bulk volume and true volume of grain (cm$^3$)

The aforementioned formula clearly indicatss that the critical agitator speed for fluidization of solid particles is a function of the tank diameter and the solid grain diameter obtained and, therefore, the rpm of stirring can not be determined unitarily, but once the conditions of such factors as the apparatus and the solid grain size, etc., have been determined, it is possible to set the rpm of stirring with the critical agitator speed for fluidization of solid particles calculated by the aforementioned formula as the standard.

As hereabove-described, the size of the coagulated grain may be freely set from fine powder to lump, but to measure the dried grains or sintered grains which are finally obtained, the shrinkage attributable to the water content in the coagulated grains needs to be taken into account.

If the physical properties of the latex particles to be treated are clarified in connection with formation of such coagulated grains, the adopting ranges of operation factors such as type and properties of coagulant, stirring conditions, temperature, residing time, etc., may be selected, but more precisely, the most desirable ranges should be determined by experiments. As an important point to consider at this time, it is actually proper to clearly qualitatively understand the mechanism of formation of coagulated grain and to learn the behavior of the coagulated grains or how they undergo changes under fluctuations in the operation factors. What is most apprehended in exercising this invention is that the coagulant which is to be scattered by dispersion ss partly dissolved and diffused in latex, thereby hampering the stability of whole of the latex, and as a result, the whole is finally coagulated. In the normal operation, this invention may be readily carried out by selecting the conditions hereabove-mentioned such as the solid concentration of latex, type, form, concentration and temperature of coagulant, stirring speed, etc. However, if this method involves any difficulty due to restrictions in the quality and cost aspects, some devices in stabilizing latex and for modifications of the apparatus are considered to become necessary. For example, for stabilization of latex, it is possible to make the coagulation after or while adding such latex stabilizers as dispersant, emulsifier, etc., and insofar as the apparatus iscconcerned, in order to suppress dissolution and diffusion of coagulant into latex, when scattering the coagulant by dispersion, the coagulant is dropped into an atmosphere in which the latex is sprayed into mist, thereby forming coagulant seeds coated with coagulated mass on their peripheries; thereafter, they are recovered and dispersed into the latex, thereby making growth by way of coagulation.

Next, since the coagulated grains obtained in this way each has latex particles arranged with substantial regularity, they have a sufficiently high strength, such that they will not be decomposed, even if immersed in water with stirring, they may be subjected to a process of removing water soluble impurities contained in such grains. Thus in order to remove such water soluble impurities as coagulant, various types of materials used for polymerization, emulsifiers, etc., which exist in the interior or on the surface of the coagulated grains, they are immersed in some aqueous phase prepared to meet the physical properties of the impurity to be removed, such as water, solution of acid or alkali, etc., and then, cleaned after the immersion, as required. In this instance, the temperature of the aqueous phase needs to be held below the softening temperature, but as it is heldaas high as possible in this range, a phenomenon of water in the coagulated grains being discharged out of the grains is often observed; in such occurrences, compacting of latex particles advances, with resultant shrinkage of grains. Because of the expelling and diffusion into the aqueous phase of the internal water accompanying the shrinkage of the coagultted grains, the content of foreign matters in the grains can be effectively reduced. In addition, since the water content is greatly reduced, this provides an effective means for energy saving, where it comes down to the problem of energy consumption at the time of drying. Simultaneously, easy removal of water soluble foreign matters is made possible or acids and alkalis to be reactd therewith may be introduced through interstices between latex particles in each grain. Conversely, when any substance is desired to be uniformly contained in the grains, it may be readily realized by preparing its aqueous solution, dipping the grains therein and, then, taking them out therefrom. However, if the grains are subjected to a heating treatment in an aqueous phase at a temperature higher than their softening point, the grain softens and fuses from its surface layer; therefore, it becomes difficult for the water inside the grain to escape and the surface layer becomes contiguous; consequently, notable shrinkage no longer takes place, leaving voids inside the grain even after dried. The extent of this phenomenon is determined by the balance between the fusion of surface layer and the rate of fleeing of water and the higher the temperature, the fusion proceeds faster, leaving larger voids.

And then, when this coagulated grain is dried at a temperature lower than its softening temperature, as the water content existing in the interstices between latex particles inside the coagulated grain has been removed, capillery force is produced; as a result, by the action of mutually drawing latex particles by a strong force, the inside of the grain is further densely packed, forming nearly perfect hexagonal close-packed structure. This may be inferred from the facts that it is surmised to have a crystal structure, because free section can not be obtained, but cleaved surface appears, when the dried grain is divided, that all fragments of the grain produced when it is divided have the same form, which is a form of crystal regarded as that of monoclinic or hexagonal system and that the packing rate of latex particles is higher than 73%, etc. As hereabovedescribed, even though the latex particles are in contiguously communicated state, such that any volatile matters are quite readily removed. This permits easy removal by drying of not only foreign matters bu that of water existing in the interior of the grain, that is, in interstices between latex particles. Besides, by immersing the dried grains in some organic solvent which does not cause dissolution or swelling of grains, oil soluble impurities may be readily removed. And conversely, by mixing the grains with some liquid or solution or dipping them in such liquid or solution, desired substance may be uniformly contained by them. The latex particles in the dried grain are not agglomerated by mutual fusion, and it is, therefore, possible to readily decompose it into the latex particles, the smallest unit, by applying a moderate force. And when they are put in some solvents which dissolve or swell them, they are readily dissolved or dispersed and in liquids which do not dissolve nor swell them, they may be turned into fine dispersion in which they are decomposed into latex particles under vigorous stirring.

If coarsely packed part is desired to be produced in the grain interior in the drying process, it is proper to tip the balance toward the latter between the fleeing speed of water from inside the grain and the fusing rate between latex particles and so to make the drying at high temperature. However, since in air drying, the material temperature is held at the wet ball temperature in the constant drying rate period, the temperature needs to be somewhat higher than the softening and fusing temperature of the latex particles. Hwever, in such substances as macromolecules which have small thermal conductivities, the temperature of only the grain surface layer rises, so that with rising temperatures, the phenomenon of forming shell on grain become more often observable. To avoid this phenomenon, it is advisable to conduct the drying using overheated steam. The softening temperature used here implies the temperature at which latex particles mutually fuse under the atmospheric pressure; generally, it may be regarded as the melting point of a substance. However, for macromolecules, definite melting points can hardly be determined in defining this temperature. For same composition polymers, it is not determined by their polymerization degrees and distribution only, but is greatly influenced by their crystalinity and foreign matters which impart plasticizing effect. However, actually, it may be considered to fall within the range of $$\frac{Tg + 273}{0.8} - 273 \sim \frac{Tg + 273}{0.6} - 273$$

assuming the glass transition point to be Tg (°C.). In actually exercising this invention, approximate value of the softening point may be grasped, if approximate value of Tg of the macromolecule is known; as a consequence, the applicable temperature range may be readily ascertained by trying the measurements at a few temperatures. Especially, if the substance is a blend of more than two types of latexes and so has a plurality of Tg, use of th minimum value of Tg is advisable. But higher Tg may be applied, if this value is that of its main component amounting to more than 60% by weight of the mix. Even though the temperature is lower than the softening temperature, the lower the better and it should preferably be further more than 20° C. lower than the softening temperature.

The appropriateness of the above-described surmise is confirmed by the result of observation of the interior of the grains obtained by operation at various temperatures, using polymer latices with various different softening temperatures, the observation made by use of a scanning electron microscope to see whether or not the latex particles have been agglomerated by fusion (PHOTO 6). As the grain shrunk and fine-grained by drying and heating treatment is fractured, streaks which represent the growth-making traces and a crystal surfaces' regular staired and layered arrangement manifest themselves more definitely than the coagulated particles in the interior of the grain (PHOTO 4). Thus in view of this fact, as combined with the consideration of the cleaved surface, the shrinkage of the grain seems to take place along the crystal surface.

Next, if need be, by subjecting the coagulated grains after dried to a sintering treatment at a high temperature higher than the softening temperature at which latex particles agglomerate by mutual fusion, compacted grain having no voids in the interior of the grainiis obtainable. By this process, the grain's interior turns into a homogeneously melted state, resulting in further shrinkage. As a result, the grain turns from a white mass lacking transparent feel to a lustrous appearance with transparent feel; thus, a resinous matter turns into transparent grains (PHOTOS 1 and Since this sintering operation may be run simultaneously with the drying operation, thus continuously therefrom, the sintering operation may be started with the coagulated grains as they are, or immediately after the aforementioned heating treatment. However, if the surface layer of a grain fuses to form a contiguous layer, while water is remaining in the interior of the grain, voids will be formed in the interior of the grain; it is, therefore, of course necessary to see to it that the temperature condition should be set somewhat lower. And if oxidation of material resulting from the sintering operation run in air is apprehended, it is proper to conduct the treatment in an atmosphere devoid of oxygen, for example in such an inert gas as nitrogen, etc., in overheated steam or in vacuum. As for the temperature for making the sintering operation, the higher the temperature, the rapider the speed with which the operation may be accomplished, insofar as no quality deterioration occurs from decomposition or oxidation, etc., of macromolecules. Besides, by combining the conditions of temperature and operation time, the extent of the fused and dissolved state of latex particles in the interior of the grain may be readily controlled; accordingly, ajjustments to desired states may be made in keeping with the objects.

In enabling the intra-granular compacting to be done by the sintering treatment, it seems important that the latex particles inside the dried grains of the material are regularly and utmost closely packed. The grains obtained through the sintering treatment in this way will give cleaved surface, when fractured, even when their interior is forming a melted homogeneous contiguous layer. That is to say, the fracture tends to occur at a specified surface, and quite hardly occurs nn other surfaces. And the staired and layered crystal structure makes its appearance more prominently than in the particles before sintered and the stripe pattern which seems to have been the growing surface becomes distinct (PHOTO 5).

In contrast, various conventional coagulating methods have been notified. Coagulated grains obtained by whichever of such methods are aggregates of latex particles flocculated at random. Since such coagulated grains are soft and brittle, they must be heated to above their softening temperature or fused and solidified with addition of organic solvents, so that high enough grain holding strength to withstand handling may be ensured. Accordingly, the grain forms a continuous layer by the fusion of latex particles, with the interstices between latex particles blocked. In addition, the grain surface forms a fused layer, which makes transfer of matters from within the grain very difficult; on this account, the efficiency of removal of water soluble impurities, oil soluble impurities or volatile components etc., at the time of aqueous phase immersion or drying operation is notably low, thus, often making the removal operation impractical because of degradation in quality during the operation in addition to lowered productivity.

On the other hand, the grains are not adequately shrunk even by drying or sintering; therefore, compacted aggregate inside the grain is not obtainable; grains having many a cavity or void inside the grains are produced. And even if their drying and sintering can be done without subjecting the coagulated grains to heating treatment, the shrinkage and compacting of latex particles due to their rearrangement does not take place; they are produced only as grains having numerous voids and which is brittle. In addition, since spherical grains which are large and have equalized grain size cannot be obtained, eventually, they are inevitally grains having small bulk specific gravities, low fluidity and abounding foreign matters.

Thus it is very difficult to disperse or dissolve the grains obtained by the conventional methods in liquid even after dried and in addition, degradation in their quality due to the presence of foreign matters is unavoidable. Even after they have been sintered, if their direct injection molding is tried, notable decline in productivity due to insufficient nipping into the screw, short shot due to insufficient rate of injection or flowmark and yellowing phenomenon result and in addition, development of silver streaks caused by embraced air or foreign matters and degradation in physical properties of molded products accompanying therewith emerge prominently.

In the grains of this invention, a little random coarsely packed part which was produced at the center of the coagulated grain is left as a void without undergoing adequate shrinkage whether before or after the sintering (PHOTO 2). This is identical with the phenomenon that coagulated grains obtained by the conventional method doe not make adequate shrinkage. And similarly, the minute cavity at the center which is produced when the coagulant is solid is left without being adequately shrunk. However, such a minute void a the center is quite negligible in compaiison with the whole of the grain; it is only proper to regard the whole as a fine-grained packed mass.

According to the above coagulation procedures, the particle size of the coagulated grains obtained can be freely determined by a suitable choice of the kind and amount of the coagulant, agitation conditions, coagulation time, etc., but an average particle size of 1 mm or more is desirable from separation of the coagulated grains from the polymer latex. The upper limit is 10 mm on the average, because too large particle size takes much more time for immersion-in-hot water treatment and thus is uneconomical.

As the coagulant used according to this invention, there are available materials which are capable of coagulating latex or those consisting of two parties of materials, one to be preliminarily mixed into latex and the other newly added, which by way of reaction, etc., produce materials having coagulating function.

The materials which can induce coagulation can be either gas, liquid or solid. Or a coagulated slurry formed by coagulating latex beforehand can ee utilized as a coagulant. In this reaction, a slurry preliminarily coagulated, using the aforementioned coagulant, may be used as a coagulant for the same or different type of latex. It may be provided as a capsuled composite body. Or powder particles prepared beforehand may be impregnated or mixed with the aforementioned coagulant and this powder is, then, to be added to latex as a coagulant. This product is formed as a capsulated composite body (this method is identical with preliminarily forming coagulant seeds).

Coagulants used in the state of liquid or solid include, e.g., inorganic salts such as sodium chloride, potassium chloride, lithium chloride, sodium bromide, potassium bromide, lithium bromide, potassium iodide, potassuum sulfate, ammonium sulfate, sodium sulfate, ammonium chloride, sodiumnnitrate, potassium nitrate, potassium chloride, ferrous sulfate, magnesium sulfate, zinc sulfate, copper sulfate, barium chloride, ferrous chloride, magnesium chloride, ferric chloride, ferric sulfate, aluminum sulfate, potassium alum, iron alum, etc.; inorganic acids such as hydrochloric acid, sulfuric acid, phosphoric acid, nitric acid, etc.; inorganic alkalis such as sodium hydroxide, potassium hydroxide, calcium hydroxide, magnesium hydroxide, etc.; organic acids such as acetic acid, formic acid, etc., and salts of organic acids such as sodium acetate, potassium acetate, sodium formate, potassium formate, etc.; which are available as single or mixed solids or liquids, or their aqueous solutions or solutions in water soluble organic solvents. Solids may be added in slurry form by dispersing them in organic solvents in which they are hardly soluble, but which are soluble in water.

Whatever latex iill do as the object substance of this invention, only if it consists of particles recoverable by coagulation in solid form; it is not subject to limitation by the size of the latex particles which are forming the dispersion phase.

What is called here solid is a substance which behaves as a solid or a substance which may be handled as such; rubbery materials which are elastic bodies or gelled plastic materials with high viscosities are also included in the applicable range, to be sure. Those being coagulated masses which show fluidity at the normal temperature, but which turn into solid by cooling may be also included, with a provision that the operation shall be run under cooling. For example, following substances or almost all polymer latices which are in substance obtained by emulsion polymerization or suspension polymerization and whcih may be recovered in resinous state may be taken as objects to which this invention is applicable.

Single or mixed polymer latexes formed by polymerization, copolymerization or graft polymerization of monomer compositions consisting of one member or two or more members of monomers as their main components selected from among following monomer groups may be taken up as the objects. It goes without saying, however, that unpolymerizable monomers rre excluded. Aromatic vinyl compounds such as styrene, monochlorostyrene, dichlorostyrene, α-methyl styrene, etc.; vinyl cyanides such as acrylonitrile, methacrylonitrile, etc.; acrylic esters such as methyl acrylate, ethyl acrylate, butyl acrylate, etc.; methacrylic esters such as methyl methacrylate, ethyl methaacrylate, butyl methacrylate, etc.; vinyl halides such as vinyl chloride, vinyl bromide, vinyl fluoride, etc.; vinylidene halides such as vinylidene chloride, vinylidene bromide, etc.; acrylic acid, methacrylic acid, itaconic acid, maleic acid, vinyl acetate, ethylene, propylene, butylene, butadiene, isoprene, chloroprene; and cross-linking monomers such as allyl methacrylate, diallyl phthalte, triallyl cyanurate, monoethylene glycol dimethacrylate, tetraethylene glycol dimethacrylate, divinyl benzene, glycidyl methacrylate, etc.

Further, following polymer latexes may be particularly preferably usable according to this invention:

(1) Polymer latexes obtained by polymerizing monomers consisting of 20-80 parts of acrylocitrile monomer, 20-80 parts of one member or a mixture of two or more members of vinyl chloride, vinylidene chloride, vinyl bromide and vinylidene bromide and 0-10 parts of an easily dyeable monomer.

(2) Butadiene base polymer latexes consisting of 0-50 wt. % of styrene (% by weight, hereinafter % is meant to designate wt. %, unless it is defined by any other type of physical unit) and 50-100% of butadiene.

(2') Polymer latexes obtained by polymerizign 20-80 parts of monomers consisting of 0-50% of acrylic esters, 0-100% of methacrylic esters, 0-90% of aromatic vinyl compounds, 0-90% of vinyl cyanide and 0-20% of other copolymerizable monomers in the presence of 20-80 parts of butadiene base polymer latex of (2).

(3) Polymer latexes obtained by polymerizing 80-100 parts of monomers consisting of 0-100% of methyl methacrylate, 0-60% of other methacrylaic esters exclusive of methyl methacrylate or acrylic esters, 0-90% of aromatic vinyl compounds and 0-90% of vinyl cyanide in the presence of 0-20 parts of rubbery polymer latices consisting of 0-50 styrene, 50-100% of butadiene and 0-30% ofaacrylic ester.

(4) Mixed latexes of 0-50 parts of a graft copolymer (A) formed by polymerizing 10-90 parts of one member or two or more members selected from among aromatic vinyl compounds, methacrylic esters, acrylic esters and vinyl cyanide in the presence of 10-90 parts of butadiene base polymers consisting of 0-50% of styrene and 50-100% of butadiene, and 50-100 parts of oolymers formed by polymerizing monomers including 0-70 mol % of α-methyl styrene and also including 30-100 mol % of one member or two or more members of monomers selected from among aromatic vinyl compounds, methacrylic esters, acrylic esters, acrylic acid and vinyl cyanide.

(5) Polymer latexes obtained by polymerizing 15-95 parts of one memberoor two or more members of monomers selected from among methacrylic esters, vinyl cyanide, acrylic esters, aromatic vinyl compounds and other monomers which are copolymerizable with these compounds in the presence of 5-85 parts of rubbery polymers obtained by polymerizing 40-100% of acrylic esters, 0-60% of one member or two or more members of monomers selected from among aromatic vinyl compounds, vinyl cyanide, vinyl chloride, vinylidene chloride, vinyl acetate and conjugated diolefins and 0-10% of bridging agent.

(6) Polymer latexes obtained by polymerizing 40-100 parts of vinylidene chloride and 0-60 parts of one member or two or more members of monomers selected from aromatic vinyl compounds, vinyl cyanide, acrylic esters, methacrylic esters, acrylic acid, methacrylic acid, itaconic acid, maleic acid and bridging monomers.

(7) Polymer latexes obtained by polymerizing 40-100 parts of vinyl chloride, 0-20 parts of vinyl cyanide and 0-60 parts of one member or two or more members of monomers selected from among vinylidene chloride, vinyl bromide, vinylidene bromide, acrylic esters, methacrylic esters, acrylic acid, methacrylic acid, itaconic acid, maleic acid and bridging monomers.

(8) Polystyrene latex obtained by polymerizing 100% of styrene monomer (Actions and Effects)

Grains obtained in this way have the following particular features:

(1) Removal of valatile solvents containing inorganics salts and organic water soluble foreign matters, oil soluble foreign matters and residual monomers is easy. Thus the product may be recovered as high purity grains.

Because the interstices between latex particles in the grain may be kept in the state of being contiguously communicated without being blocked, removal by way of extraction and cleaning of water and oil soluble foreign matters in permeating or cleaning operation in water or with solutions of acids, alkalis, etc., or further with organic solvents such as alcohols, ketones, etc., is easy. Besides, in the drying operation or in the stripping operation by way of aeration in the state of their being dispersed in aqueous phase, etc., extremely rapid removal of volatile components is realized; as a result, removal of volatile matters with high boiling points becomes easy. Accordingly, grains can be obtained by this invention with high purity.

(2) Water soluble substances, oil soluble substances and liquid substances may be uniformly permeated into the interior of the grain.

Coagulated grains, when immersed in aqueous phase or as dry grains, may be readily impregnated with desired substances by contacting them with the grains in the form of solution or liquid, taking advantage of the fact that the whole of each grain has interstices between latex particles. It should, them, be the prerequisite that the material with which to impregnate the grains, of course, can not be scattered or decomposed in the subsequent drying and sintering processes and conversely, the medium liquid needs to be removed by vaporization or decomposition, etc. And it is desired that the medium liquid does not block the interstices between latex particles, dissolve nor highly swell the grains.

(3) Their dispersion and dissolution into solvent is easy.

In uses which involve dispersing or dissolving once dried grains in aqueous solutions or organic solvents, the rate of dispersion and the rate of dissolution is high and the dispersed grains may be finely dispersed as latex particles being the uniform basic particles.

Normally, as a method of dissolving macromolecules in organic solvent, the dissolving power of solvent is diminished by lowering the temperature and after homogeneously dispersing the grains in the solvent, the temperature is raised, thereby making their dissolution. The grains of this invention may be readily dismenbered and scattered into latex particles by applying a moderate force as by stirring, etc., for as the solvent has been permeated into the interstices between latex particles, the latex particles are not fused to each other.

(4) The grains have excellent physical properties and particular features.

Notwithstanding the fact that the latex particles in the dried grains are not completely agglomerated by fusion, the latex particles are compacted, so that adequately high form holding strength may be provided; thus they can withstand such physical operations as normal transportation, storage, etc., without suffering disintegration of the grains. Besides, the grains bulk specific gravity is larger than those of conventional products, so that the flow ss greatly improved. And because fine powders are not produced at all, handling of grains is facilitated. As hereabove described, in addition to enabling reduction in packaging and transportation costs, solution of blocking and bridging problems in storage tanks, truck lorry and bulk transport and silo storage, where macromolecules are concerned, this invention is useful not only in tthe cost aspect, where high workability at the time rr processing and molding, remarkable improvement in otherwise dust-laden environment and realization of automation at the processing time can be achieved, but in processing and molding macromolecules, where because homogeneous gellation is practicable, production of partly ungelled grains having fish eyes in molded products may be prevented, thus enabling stable production of homogeneous mold and high quality products.

(5) Direct injection molding is made practicable by omitting the pelletizing process.

The grains obtained by the sintering treatment become massss compacted to the same degree as in the pellets or molds being fused masses obtained through processing molders. Thus they are heavy grains with high densities.

The grains obtained in this way, nn addition to the aforementioned merits, wholly elimnnate the drawbacks of conventional emulsion polymers which heretofore, required pelletizing process on account of coarse surface state of the injection molded products resulting from the grains' high porosity and existence of foreign matters therein, thus enabling direct injection molding, etc.; on this ground, such merits as still greater savings in energy, labor, costs, etc., are expectable.

(PREFERRED EMBODIMENTS)

In the following, this invention is described in connection with its preferred embodiments and comparative examples, but is not anyway bound thereby. It should also be noted that in the following description, % means % by weight, unless otherwise particularly specified.

EXAMPLE 1

A polymer latex was prepared by graft copolymerization of a mixture of styrene, acrylonitrile and methyl methacrylate onto butadiene polymer. It was a polymer latex with its softening temperature 105° C. being a mixture of 35% of a polymer latex (A) consisting of 60% of butadiene, 10% of methyl methacrylate, 10% of acrylonitrile and 20% of styrene and 65% of another polymer latex (B), a homo-copolymer, consisting of 20% of α-methyl styrene, 25% of acrylonitrile and 5% of styrene. From such a latex, 6 l of a polymer latex with solid content of 30% and held at a temperature of 0° C. was taken in a 10 l stainless steel container and was stirred at the room temperature (approx. 24° C.) using a three vane propeller with d/D=0.5 at 200 rpm. As a coagulant, granular salt (grain size 0.2–0.5 mm) was added to it, to be dispersed therein; and approx. 10 sec. later, it was treated for 20 min, while gently stirring it at a number of revolutions of 60 rpm.

Then coagulated grains were separated from said polymer latex by passing it through a 60 mesh sieve; further, the coagulated grains were immersed in warm water held at 60° C. for 30 mnn and, then, passed through a 100 mesh sieve; these grains thus taken out were water rinsed and dehydrated by a Nutche and, thereafter, were dried for about 2 hr at 60° C. in an oven shape drier. Furthermore, the grains were subjected to a sintering treatment for 30 min at 140° C. in nitrogen atmosphere.

The grains obtained after the drying were white rue spherical grains, as seen in PHOTO 1, with bulk sp. gr. 0.49 (g/cm$^3$), grain size evened up to have a grain size distribution of 96% for 6–16 meshes and average grain size 2.3 mm. The interior of the grain, as seen fractured in PHOTO 2, is highly compacted, except the coarsely packed part due to a small size of coagulant trace at the grain center. And water soluble sulfur compounds which were contained at 0.87% in the latex were reduced to 900 ppm (both concentrations by weight in proportion to resin, the same shall apply hereinafter) and residing α-methyl styrene monomer diminished from 1.7% to 75 ppm.

In the latex separated, no mixed-in fine coagulant grain was found at all. The grains obtained were put in a dilute soap solution and left after shaking at room temperature. After leaving them for 40 min the grains were found again dispersed into latex particles.

And the grains obtained by sintering were, as shown in PHOTO 3, lustrous pearly heayy grains with transparent feel and bulk sp. gr. 0.66 (g/cm$^3$). In the grains, sulfur compounds were 780 ppm, and residual α-methyl styrene 30 ppm.

When the grains were directly injection-molded, moldability equivalent to that of pellets was achieved, and physical propertees including only slightly colored appearance and high shock resistance that surpass those of molds from pellets obtained.

COMPARATIVE EXAMPLE 1

When the same operation as in Example 1 was run, but with the number of revolutions of the stirrer not reduced, but remained at the initially set 200 rpm, coagulation of the whole began about 15 min later and 18 min later, the latex in the beaker was all coagulated and solidified; thus, the granulation of its particles failed. The coagulated mass was givenffluidity by turning it into a slurry with 15% solid content deniity by adding water, which was heated at 120° C. for 30 min under stirring in a pressure resistant autoclave, dehydrated in a Nutche and, then, dried at 90° C. for 2 and a half hours after water rinsing.

This powder was composed of amorphous grains having abounding fine powders with 42% passing 230 mesh, and 33% 270-60 mesh; its bulk specific gravity was 0.43. And it contained 0.64% of sulfur compounds and 1.2% of residual α-methyl styrene. It could no longe be redispersed in water nor subjected to injection molding.

EXAMPLE 2

An amount of 300 ml of a polymer latex consisting of 35% of styrene, 30% of methyl methacrylate and 35% of butadiene and with solid content of 30% and softening temperature 55° C., being a polymer latex formed by graft-copolymering a mixture of styrene and methyl methacrylate onto copolymer of styrene and butadiene, was taken in a 500 ml beaker, cooled to 5° C. from outside with ice water and gently stirred, using a screwing-up 3 vane propellers with d/D=0.5 at 100 rpm, with concentrated hydrochloric acid solution (approx. 35%) cooled to 5° C. dropped from pipet as coagulant.

After treating the polymer latex for about 10 min as it is, the coagulated grains were separated therefrom by means of a 60 mesh sieve, further immersed in water at 40° C. and stirred for 10 min, after adjusting pH to 5.0 with NaOH. Then following their water rinsing and dehydration in a Nutche, they were dried at 40° C. for about 4 hr in an oven type drier. Further, they were subjected to sintering treatment at 120° C. for 40 min in nitrogen atmosphere.

The grains obtained after drying were white true spherical grains with their average grain size 4.2 mm and bulk sp. gr. 0.44 (g cm$^3$) which had almost no void inside the grain. When about 1 g of the grains were put in 20 ml of dichloromethane contained in a 100 ml triangular flask and the mixture was stirred at room temperature by means of a stirrer, then, a homogeneous solution was obtained 2 min later. The residual styrene monomer was reduced from 750 ppm to 10 ppm.

On the other hand, the sintered grains were highly compacted grains with a pearly luster and a bulk sp. gr. of 0.55 (g/cm$^3$).

COMPARATIVE EXAMPLE 2

The coagulation was performed at 60° C. latex temperature in the process of Example 2. No sooner had hydrochloric acid been added, large amorphous lumps were formed which were coagulated grains with uneven grain sizes. And when dried, the grains were not well shrunk and had many cavities left in their interior.

EXAMPLE 3

An amount of 6 l of a polymer latex with solid content of the latex 30% and held at 30° C., being a polymer latex formed by copolymerizing a mixture of styrene and acrylonitrile onto a butadiene copolymer or a polymer latex with a softening temperature 112° C. formed by mixing 30% of a polymer latex (A) consisting of 65% of butadiene, 10% of acrylonitrile and 25% of styrene and 70% of a polymer latex (B) or a homo-copolymer consisting of 70% of α-methyl styrene, 10% of methyl methacrylate and 20% of acrylontirile, was taken in a 10 l stainless container, and strongly stirred at 20 rpm, using a screwing-up 3 vane propeller with d/D=0.5, to be turned into a dispersion with addition of 30% aqueous solution of potassium chloride and about 10 sec later, this treatment was continued for 10 min, under gentle stirring at a number of revolution of 60 rpm.

Then coagulated grains were separated from the polymer latex, using a 60 mesh sieve, and further put in a 10 l stainless steel container filled with 6 l of water and the mixture was slowly stirred at 80° C. for 60 min. Subsequently, they were water-rinsed and dehydrated by use of a Nutche and, then, dried at 90° C. for 3 hr in a box shape drier. The filtrate was in such a filthy state that it stinked. The water content of the grains after dehydrated decreased from 64% before immersion in warm water to 47%. And the amounts of chlorine ions and sulfate ions in the grains, as determined before and after the immersion in warm water, were found markedly diminished from their values before immersion in warm water of 1.3% and 0.7% to less than 0.3% and 0.1%, respectively (the % was recalculated in terms of dried grains). The dried grains were white true spherical grains with bulk sp. gr. 0.48 (g/cm$^3$) and evened up in grain size with mean value 4.5 mm.

And the amount of residual α-methyl styrene in dried grains, as measured by gas chromatography, was found notably declined from 1.9% after their immersion in warm water to 120 ppm.

As this dried grain was fractured to observe its interior, a fracture with staired streaks along its cleavage surface, as shown in PHOTO 4, was seen manifesting itself.

When the grains were subjected to sintering treatment at 140° C. for 30 min in an nitrogen atmosphere, the grains further shrank and compacted grains with mean grain size 3.1 mm and having almost no intragrain porosity could be acquired. The grains thus obtained were grains with bulk sp. gr. 0.65 (g/cm$^3$) and having pearl like luster and highly transparnnt feel.

On the fracture of this sintered grain, a more distinct staired streaks appeared, which, together with the cleavage surface, indicates the way in which the particles were very closely packed (PHOTO 5).

When these grains were directly injection-molded, moldability and processing physical properties equivalent to those of pellets were obtained.

COMPARATIVE EXAMPLE 3

Similar operation as that of Example 3 was run with the solid content of the latex set at 3%; 2 min latex, coagulated granns formed any way were separated, but they were too soft and lacking in holding power, so that when separating theccoagulated grains from the polymer latex using a sieve, the grains broke down. But after a lapse of about 5 min, the whole of latex begins coagulating, then turning into a viscous agar-agar like coagulated mass.

EXAMPLE 4

An amount of 6 l of a latex with its solid content of 30% and held at 30° C., being a polymer latex of the same composition as that of Example 3, was taken in a 10 l stainless steel container, and stireed using a screwing-up 3 vane propeller with d/D=0.5 at 100 rpm, to be turned into a dispersion with a 35% aqueous solution of HCl as a coagulant added as 2–3 mmφ drops and after a lapse of about 3 sec, this treatment was continued for 20 min, under gentle stirring at a number of revolutions of 50 rpm.

Then coagulated grains were separated from the polymer latex using a 60 mesh sieve; they were, then, immersed in water at the room temperature and left there for 30 min under stirring, after the pH was adjusted to 8.0 with potassium hydroxide. And after water rinsing and dehydration by use of a Nutche, the grains were dried for 3 hr in a box shape drier. Further, when they were subjected to sintering treatment at 140° C. for 40 min in an nitrogen atmosphere, compacted grains with grain sizes6–12 mmφ could be obtained. The grains obtained had a bulk sp. gr. of 0.61 (g/cm$^3$), pearly luster and highly transparent feel. In these grains, sulfur compounds were 720 ppm; chlorine ions 0.6%; and residual α-methyl styrene 220 ppm. When these grains were directly injection-molded, an excellent result equivalent to that of Example 3 was obtained.

COMPARATIVE EXAMPLE 4

In the process of Example 4, the coagulated grains were dried and subjected to sintering treatment, without subjecting them to the immersing treatment. The grains obtained were no different from those of Example 4, but in the grains, sulfur compound were 0.66%, and chlorine ion 3.7%, showing abundant existence of foreign matters.

When these grains were directly injection-molded, many a silver streak were produced on the surface of the mold.

EXAMPLE 5

After adjusting to 20% the solid content of the polymer latex of the same composition as that of Example 3 by diluting the latex with distilled water, 300 ml of this latex was taken in a 500 ml beaker, cooled to a liquid temperature of 5° C. with ice water, and vigorously stirred, using a screwing-up 3-vane propeller with d/D=0.5 at 1300 rpm, to be turned into a dispersion, with an 8% aqueous solution of potassium chloride cooled to 5° C. added as a coagulant; then, after a lapse of about 10 sec, the treatment was continued for 1 min 30 sec under gentle stirring at a number of revolutions of 100 rpm.

Then coagulated grains were separated from the polymer latex using a 100 mesh sieve and immersed in water at the room temperature and after leaving them there for 30 min under stirring, their water rinsing and dehydration by use of a Nutche were carried out. Thereafter, they were dried at 90° C. for 3 hr in an oven type drier. When they were further subjected to a sintering treatment at 140° C. for 40 min in an nitrogen atmosphere, minute grains could be obtained which were highly transparent and highly compacted to have a bulk sp. gr. of 0.64 (g/cm$^3$) and 83% of which passed 48–80 mesh.

COMPARATIVE EXAMPLE 5

When similar operation as that of Example 5 was run with the initial number of revolutions set at 100 rpm, most of coagulated grains obtained were agglomerated in a tumbler shape, giving poor fluidity and their bulk sp. gr. lowered to 0.55 (g/cm$^3$) to boot, and moreover, the coagulated grains were observed sticking on the vanes of the stirred.

EXAMPLE 6

An amount of 300 ml of a polymer latex consisting of 50% of acrylonitrile and 10% of vinyl chloride with its solid content density 25% and softening temperature 86° C., being a polymer latex formed by copolymerizing a mixture of acrylonitrile and vinyl chloride, was taken in a 500 ml beaker, and vigorously stirred at the normal temperature using a screwing-up 3-vane propeller with d/D=0.5, to be turned into a dispersion with potassium chloride powders added as a coagulant; then, after immersing them in water at the normal temperature and leaving them there for 30 min under stirring, water rinsing and dehydration by use of a Nutche were performed. Thereafter, they were dried at 45° C. for about 4 hr in a box shape drier.

The grains thus obtained after drying were white true spherical grains with their grain size evened up at 2.6 mm. When approx. 5 g of these grains were taken and added in 20 ml of acetone cooled to −15° C. and shaken by hand, a homogeneous dispersed state was achieved 5 min later.

EXAMPLE 7

An amount of 300 ml of a polymer latex with solid content 35%, which was formed by subjecting vinyl chloride only to suspension polymerization, was taken in a 500 ml beaker and stirred at the room temperature, using a screwing-up 3-vane propeller with d/D=0.5 at 400 rpm, to be turned into a dispersion, with potassium chloride powders added as a coagulant; then, after a lapse of 10 sec, this treatment was continued for 5 min under gentle stirring, with the number of revolution reduced to 100 rpm. Subsequently, coagulted grains were separated from said polymer latex through a 60 mesh sieve; then, a water flow was passed on said mesh, thereby making immersion and water rinsing, followed by quick draining. When the product was dried at 50° C. for about 3 hr in a box shape drier, white true spherical grains with diameter approx. 2 mm were obtained. These grains could be readily broken into fine powders of latex particles (diameters 0.5–1.0 μm) by strongly rubbing them with fingers. And when 50 g of these grains were put in 50 ml of DOP (dioctyl phthalate), a homogeneous dispersion was obtained 5 min later.

A fracture of this grain showed a grain interior having latex particles not fused to each other but finely compacted.

EXAMPLE 8

With 12% of polystyrene latex obtained from styrene monomer only by polymerization without using any emulsifier, with ammonium persulfate as a polymerization initiator, coagulated grains were obtained by the similar operation as of Example 7 under a state of the temperature being held at 70° C.

When these coagulated grains were dried at 40° C. for about 3 hr in a box shape drier, white true spherical grains with diameter approx. 4 mm were obtained.

It was confirmed under a scanning type electron microscope that in the interior of this grain 0.3 μm spherical latex particles were finely compacted. These grains could be readily broken into latex particles, to yield fine powders, by rubbing them with fingers. Further, when these dried grains were heated at 110° C. for about 30 min in a box shape drier, they turned into nearly transparent hard spherical beads.

What is claimed is:
1. Coagulated grains having thieir component latex particles compacted therein without being fused to each other, which are formed by the steps of
   (A) into a polymer latex manufactured by emulsion polymerization or suspension polymerization, adding a coagulant at a temperature lower than the softening temperature at which the latex particles adhere to each other by fusion, dispersing and scattering said coagulant as minute volumes in said polymer latex, before said coagulant is dissolved and diffused into said polymer latex;
   (B) allowing the coagulant to dissolve and diffuse into said latex from the scattered minute volumes of coagulant, so that the latex particles are coagulated on the surfaces of the minuee volumes of said coagulant which serve as centers for coagulated grains which grow from inside out, thereby forming spherical coagulated grains of an arbitrary range of sizes filled with regularly arranged latex particles;
   (C) separating said coagulated grains from said polymer latex;
   (D) immersing the separated coagulated grains in water, while holding the temperature of said coagulated grains at a temperature lower than the softening temperature of the latex particles and;
   (E) thereafter, drying the coagulated grains at a temperature lower than the softening temperature of the latex particles.

2. Spherical latexd particle aggregates with high density, which have an internal structure composed of latex particles finely and homogeneously compacted so that no void remains in the interior of each particle aggregate, said particle aggregates being formed by the steps of:
   (A) into a polymer latex manufactured by emulsion polymerization or suspension polymerization, adding a coagulant at a temperature lower than the softening temperature at which the latex particles adhere to each other by fusion, dispersing and scattering said coagulant as minute volumes in said polymer latex, before said coagulant is dissolved and dissolved and diffused into said polymer latex;
   (B) allowing said coagulant to dissolve and diffuse into said latex from the scattered minute volumes of said coagulant which serve as centers for coagulated grains which grow from inside out, thereby forming spherical coagulated grains of an arbitrary range of sizes filled with regularly arranged latex particles;
   (C) separating said coagulated grains from said polymer latex;
   (D) immersing the separated coagulated grains in water, while holding the temperature of said coagulated grains at a temperature lower than the softening temperature of the latex particles;
   (E) drying the coagulated grains at a temperature lower than the softening temperature of the latex particles to obtain coagulated grains having latex particles compacted therein without being fused to each other; and
   (F) further heating and melting said coagulated grains at a temperature higher than the softening temperature of the latex particles.

3. The coagulated grains of claim 1 or 2, wherein the average diameter of said grains is in the range of from not less than 1 mm to not more than 10 mm.

4. The coagulated grains as specified under claim 1 or 2, wherein the temperature of said latex, when the coagulant is added into said polymer latex is more than 20° C. lower than said softening temperature.

5. The coagulated grains as specified under claim 1 or 2, wherein the solid content density of the polymer latex is higher than 7%.

6. The coagulated grains of claim 1 or 2, wherein said polymer latex is a latex of a copolymer prepared by copolymerization of a monomer mixture consisting of 20 to 80 parts of acrylonitrile, 20 to 80 parts of at least one member selected from vinyl chloride, vinylidene chloride, vinyl bromide and vinylidene bromide, and 0 to 10 parts of a dyable monomer.

7. The coagulated grains of claim 1 or 2, wherein said polymer latex is a latex of a butadiene polymer composed of 0 to 50 wt % of styrene and 50 to 100% of butadiene.

8. The coagulated grains of claim 6, wherein said polymer latex is a latex of a copolymer prepared by polymerizing 20 to 80 parts of a monomer mixture composed of 0 to 50% by weight of an acrylate, 0 to 100% by weight of a methacrylate, 0 to 90% by weight of an aromatic vinyl monomer, 0 to 90% by weight of a cyano vinyl monomer and 0 to 20% by weight of other copolymerizable monomer, in the presence of 20 to 80 parts of a latex of a butadiene polymer.

9. The coagulated grains of claim 1 or 2, wherein said polymer latex is a latex of a copolymer prepared by polymerizing 80 to 100 parts of a monomer mixture composed of 0 to 100% by weight of methyl methacrylate, 0 to 60% by weight of an acrylate or a methacrylate other than methyl methacrllate, 0 to 90% by weight of an aromatic vinyl monomer and 0 to 90% by weight of a cyano vinyl monomer, in the presence of 0 to 20 parts of a latex of an elastomer composed of 0 to 50% by weight of styrene, 50 to 100% by weight of butadiene adn 0 to 30% by weight of an arcyalte.

10. The coagulated grains of claim 1 or 2, wherein said polymer latex is a mixture of (A) 0 to 50 parts of a latex of graft copolymer prepared by polymerizing 10 to 90 parts of at least one member selected from aromatic vinyl monomers, methacrylates, acrylates and cyano vinyl monomers, in the presence of 10 to 90 parts of a butadiene polymer composed of 0 to 50% by weight of styrene and 50 to 100% by weight of butadiene, with (B) 50 to 100 parts of a latex of copolymer composed of 0 to 70 mol % of α-methylstyrene and 30 to 100 mol % of at least one member selected from aromatic vinyl monomers other than α-methylstyrene, methacrylates, acrylates, acrylic acid and cyano vinyl monomers.

11. The coagulated grains of claim 1 or 2, wherein said polymer latex is a latex of a copolymer prepared by polymerizing 15 to 95 parts of at least one member selected from methacrylates, cyano vinyl monomers, acrylates, aromatic vinyl monomer and other monomers copolymerizable therewith, in the presence of 5 to 85 parts of a latex of an elastomer composed of 40 to 100% by weight of an acrylate, 0 to 60% by weight of at least one member selected from aromatic vinyl monomers, cyano vinyl monomers, vinyl chloride, vinylidene chloride, vinyl acetate and conjugated diolefins, and 0 to 10% by weight of a crosslinking monomer.

12. The coagulated grains of claim 1 or 2, wherein said polymer latex is a latex of a copolymer prepared by polymerizing 40 to 100 parts of vinylidene chloride and 0 to 60 parts of at least one member selected from aromatic vinyl monomers, cyano vinyl monomers, acrylates, methacrylates, acrylic acid, methacrylic acid, itaconic acid, maleic acid and crosslinking monomer.

13. The coagulated grains of claim 1 or 2, wherein said polymer latex is a latex of a copolymer prepared by polymerizing 40 to 100 parts of vinyl chloride, 0 to 20 parts of a cyano vinyl monomer and 0 to 60 parts of at least one member selected from vinylidene chloride, vinyl bromide, acrylates, methacrylates, acrylic acid, methacrylic acid, itaconic acid, maleic acid and crosslinking monomers.

14. The coagulated grains of claim 1 or 2, wherein said polymer latex is a latex prepared by polymerizing 100% by weight of styrene monomer.

* * * * *

UNITED STATES PATENT AND TRADEMARK OFFICE
CERTIFICATE OF CORRECTION

PATENT NO. : 4,792,490
DATED : December 20, 1988
INVENTOR(S) : Hideo YASUI et al Page 1 of 2

It is certified that error appears in the above-identified patent and that said Letters Patent is hereby corrected as shown below:

Column 1, line 24, "solutio" should read --solution--;
line 25, "coagulatethe" should read --coagulate the--;
line 34, "high purity" should read --low purity--;
line 35, "containin" should read --containing--.

Column 2, line 19, "oo" should read --to--;
line 29, "palletizing" should read --pelletizing--.

Column 4, line 16, "scatted" should read --scattered--.

Column 5, line 10, "eeforehand" should read --beforehand--;
line 38, "rrandom" should read --random--;
line 39, "prouuct" should read --product--;
line 43, "llow" should read --flow--;
line 60, "eeing" should read --being--;
line 63, "tempertture" should read --temperature--.

Column 6, line 16, "frmm" should read --from--.

Column 7, line 45, "isside" should read --inside--.

Column 9, lines 23 and 24, "hel-daas" should read --held as--

Column 10, line 34, "Hwever" should read --However--.

Column 11, line 30, "PHOTOS 1 and Since" should read --(PHOTOS 1 and 3). Since--;
line 53, "ajjustments" should read --ajustments--.

Column 13, line 44, "iill" should read --will--.

Column 14, line 1, "rre" should read --are--;
line 43, "ofaacryhic" should read --of acrylic--.

Column 15, line 20, "valatile" should read --volatile--.

Column 16, line 14, "ss" should read --is--;
line 21, "tthe" should read --the--;

UNITED STATES PATENT AND TRADEMARK OFFICE
CERTIFICATE OF CORRECTION

PATENT NO. : 4,792,490
DATED : December 20, 1988
INVENTOR(S) : Hideo YASUI et al It is certified that error appears in the above-identified patent and that said Letters Patent is hereby corrected as shown below:

Column 16, line 22, "rr" should read --of--;
          line 38, "nn" should read --in--;
          line 39, "elimnnate" should read --eliminate--.

Column 17, line 11, "mnn" should read --min--;
          line 18, "rue" should read --true--;
          line 56, "givenffluidity" should read --given fluidity--;
          line 57, "deniity" should read --density--.

Column 19, line 39, "theccoagulated" should read --the coagulated--.

Column 21, line 66, "minuee" should read --minute--.

Column 23, line 21, "adn" should read --and--.

Signed and Sealed this

First Day of August, 1989

Attest:

DONALD J. QUIGG

Attesting Officer      Commissioner of Patents and Trademarks